United States Patent
Jung et al.

(10) Patent No.: US 6,643,333 B1
(45) Date of Patent: Nov. 4, 2003

(54) METHOD AND TRANSMITTING DEVICE FOR TRANSMITTING DATA SYMBOLS FROM SUBSCRIBER SIGNALS VIA A RADIO INTERFACE OF A MOBILE COMMUNICATIONS SYSTEM

(75) Inventors: Peter Jung, Otterberg (DE); Friedbert Berens, Kaiserslautern (DE); Joerg Plechinger, München (DE); Paul Walter Baier, Kaiserslautern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,261

(22) Filed: Sep. 28, 1999

Related U.S. Application Data

(63) Continuation of application No. PCT/EP98/01399, filed on Mar. 4, 1998.

(30) Foreign Application Priority Data

Mar. 26, 1997 (EP) .............................................. 97105149

(51) Int. Cl.⁷ .............................................. H04L 27/04
(52) U.S. Cl. ........................ 375/295; 375/146; 375/149; 375/150; 370/342
(58) Field of Search .................................. 375/295, 146, 375/149, 150, 148; 370/328, 337, 342, 347, 206

(56) References Cited

U.S. PATENT DOCUMENTS

| | | | | |
|---|---|---|---|---|
| 5,682,376 A | * | 10/1997 | Hayashino et al. | 370/206 |
| 5,822,372 A | * | 10/1998 | Emami | 375/260 |
| 5,970,060 A | * | 10/1999 | Baier et al. | 370/342 |
| 5,995,499 A | * | 11/1999 | Hottinen et al. | 370/337 |
| 6,078,576 A | * | 6/2000 | Schilling et al. | 370/347 |
| 6,192,038 B1 | * | 2/2001 | Wallerius et al. | 370/328 |

FOREIGN PATENT DOCUMENTS

| | | |
|---|---|---|
| EP | 0 752 765 A2 | 1/1997 |
| FR | 2 737 366 | 1/1997 |

OTHER PUBLICATIONS

Peter Jung et al., Joint Detection for Multicarrier CDMA Mobile Radio Systems—Part II: Detection Techniques, IEEE, pp. 996–1000, Aug. 1996.*

International Publication No. WO 96/17455 (Engström et al.), dated Jun. 6, 1996.

"Radio characteristics of the CTDMA and OFDM techniques and their possible applications to future moble services (UMTS)" (Rolando), Technical Reports, vol. 24, No. 1, Feb. 1996, pp. 149–164.

"Performance of Orthogonal Multi–Carrier CDMA in a Multipath Fading Channel" (Sourour et al.), IEEE 1994, pp. 390–394.

* cited by examiner

*Primary Examiner*—Shuwang Liu
(74) *Attorney, Agent, or Firm*—Laurence A. Greenberg; Werner H. Stemer; Gregory L. Mayback

(57) ABSTRACT

In a method according to the invention, N data symbols of a subscriber signal form a block. In a first method step, the block is divided into a plurality of partial blocks having Ns data symbols. The Ns data symbols are then allocated to sub-carriers and are modulated in parallel onto the various sub-carriers, the modulation being carried out for each of the sub-carriers with at least one individual code symbol. The sub-carriers are heterodyned to form a broadband carrier, so that the Ns data symbols are transmitted simultaneously. The transmission then takes place in N/Ns successive partial blocks via the radio interface.

25 Claims, 6 Drawing Sheets

METHOD AND TRANSMITTING DEVICE FOR TRANSMITTING DATA SYMBOLS FROM SUBSCRIBER SIGNALS VIA A RADIO INTERFACE OF A MOBILE COMMUNICATIONS SYSTEM

CROSS-REFERENCE TO RELATED APPLICATION

This application is a continuation of copending International application No. PCT/EP98/01399, filed Mar. 4, 1998, which designated the United States.

BACKGROUND OF THE INVENTION

FIELD OF THE INVENTION

The invention relates to a method and a transmitting device for transmitting data symbols from subscriber signals via a radio interface of a mobile communications system, for example for base stations or mobile stations in mobile radio networks.

Various transmission methods are disclosed in various references. These references include an article by E. Sourour et al. entitled "Performance of Orthogonal Multi-Carrier CDMA in a Multipath Fading Channel", Proceedings of the Global Telecommunications Conference (Globecom), IEEE, San Francisco, Nov. 28, 1994, Volume 1, pp.390–392; FR 2 737 366 A; an article by Rolando entitled, "Radio Characteristics of the CTDMA and OFDM Techniques and Their Possible Applications to Future Mobile Services (UMTS)", CSELT Technical Reports, Volume XXIV, No. 1, February 1996, pp.149–164; International Patent Application WO 96 17 455 A and Published, European Patent Application EP 0 752 765 A.

Code division multiple access (CDMA) radio systems with a plurality of carriers are known from a reference by G. Fettweis, A. S. Bahai, and K. Anvari, titled "On Multi-Carrier Code Division Multiple Access (MC-CDMA) Modem Design", Proceedings of the IEEE 44th Vehicular Technology Conference VTC'94, Stockholm, 1994, pages 1670–1674. When such systems are used for mobile communication, there is a radio interface between fixed-position base stations and moving mobile stations. The transmission path from a base station to a mobile station is called the downlink, and the transmission path from a mobile station to a base station is called the uplink.

However, the CDMA radio system with a plurality of carriers according to the prior art is difficult to implement in mobile communications systems since the production of the transmitted signals at the transmission end, which transmitted signals contain data symbols allocated to subscriber signals, cannot be adequately matched to the transmission conditions of the radio interface.

SUMMARY OF THE INVENTION

It is accordingly an object of the invention to provide a method and a transmitting device for transmitting data symbols from subscriber signals via a radio interface of a mobile communications system which overcome the above-mentioned disadvantages of the prior art methods and devices of this general type.

With the foregoing and other objects in view there is provided, in accordance with the invention, a method for transmitting data originating from subscriber signals via a radio interface of a mobile communications system, and N data symbols of a subscriber signal form a block, the method which includes:

dividing the block into a plurality of partial blocks each having Ns data symbols;

allocating the Ns data symbols to sub-carriers;

modulating in parallel the Ns data symbols onto in each case at least one of the sub-carriers for simultaneous transmission, a modulation for each of the sub-carriers being carried out using at least one individual code symbol;

heterodyning the sub-carriers to form a broadband carrier; and transmitting the plurality of partial blocks via the radio interface.

In the case of the method according to the invention for transmitting data symbols that originate from one or more subscriber signals, the radio interface of the mobile communications system is presupposed and uses subscriber separation, for example in accordance with the CDMA method. In this case, N data symbols of a subscriber signal form a block. Such a block is, for example, a radio block as is transmitted within one timeslot in time division multiple access (TDMA) systems.

In a first method step, the block is divided into a plurality of partial blocks with Ns data symbols. The Ns data symbols are then allocated to sub-carriers and are modulated in parallel onto these various sub-carriers, the modulation for each of the sub-carriers is carried out with at least one individual code symbol. The sub-carriers are heterodyned to form a broadband carrier, so that the Ns data symbols are transmitted simultaneously. The transmission is then carried out in N/Ns successive partial blocks via the radio interface.

The described transmission method has a corresponding receiving method performed at the receiver end. This results in the radio interface having a system structure that is highly resistant to interference as a result of the advantages of the CDMA subscriber separation (with modulation/spreading of data symbols using different code symbols), for example frequency diversity and interference diversity, and which, by using the multi-carrier method with the aid of a plurality of sub-carriers, allows flexible allocation of frequency resources. The method according to the invention allows multiple subscriber interference and inter-symbol interference to be taken into account and compensated for in an appropriate manner.

The method according to the invention makes it easier to achieve cost-effective implementation of flexible CDMA-mobile communications systems. The signal production for the subscriber separation with DS (direct sequence) CDMA and by multiple-carrier methods is combined according to the invention. The transmission of the data symbols can use the specific advantages of both methods flexibly and with a large number of degrees of freedom.

According to an advantageous development of the invention, the sub-carriers are heterodyned linearly to form a broadband carrier. The complexity of signal production and of detection after transmission is thus kept low.

According to a refinement of the invention, one data symbol is transmitted on a plurality of sub-carriers. This ensures frequency diversity for the data symbol, making the transmission more interference-resistant. In addition, it is advantageous to disposed unused frequency bands between the sub-carriers for the data symbol or groups of sub-carriers. Such interleaving of the frequency bands for different data symbols or subscriber signals results in transmission errors being scattered, and the capability to compensate for them more easily at the receiver end.

If, for a given range of allocated frequencies, sub-carriers are allocated to a partial block or to a data symbol in such a way as to maximize the interval between the center frequencies of the sub-carriers, this results in the best possible frequency diversity.

The flexibility of the method according to the invention is advantageously used, in particular, if the number of data symbols in a partial block can be varied depending on the transmission conditions of the radio interface. In this way, the bit rate can also be adapted, depending on the requirements or the maximum permissible values in the transmission conditions.

It is likewise advantageous to be able to vary the number Q of sub-carriers allocated to one data symbol, depending on the transmission conditions of the radio interface. This makes it possible to match the interference immunity to the transmission conditions and at the same time to manage the frequency resources economically.

According to a further refinement of the invention, a period which is intended for transmission of the data symbol can be varied depending on the transmission conditions of the radio interface by varying the number of simultaneously transmitted data symbols in the partial block. This allows the advantages of the multi-carrier or of the code multiplex method to be used depending on the length of the period and/or the number of simultaneously transmitted data symbols. This can be done for a constant data rate; the radio interface parameters are set individually, depending on the specific transmission conditions.

If a guard time without any transmission information is provided within a period that is intended for transmission of the data symbol, then particularly simple and economic receivers can be used at the receiver end. This option is feasible when the periods set for the data symbol are relatively long.

According to the invention, it is possible to select the data symbols without any limitations from the set of complex numbers since, owing to the sub-carrier-related modulation, a large number of individual modulation types and a large and easily variable range of combinations of data symbols and code symbols can be selected.

In addition to CDMA subscriber separation, the method according to the invention can also provide subscriber separation in accordance with a TDMA and/or FDMA method, so that it can easily be implemented in existing mobile radio networks.

The modulation is prepared in a sub-carrier-related manner by using a memory device for storing values of individual codes in matrix form, these values including any required linear transformation of the data symbols to form modulated data symbols and/or pulse shaping of the data to be transmitted, by weighting.

The control device advantageously allow symbol-related individual processing of the data symbols to be carried out by allocating a different number of sub-carriers to at least two data symbols in a block, or by dividing a block into at least two partial blocks with a different number of data symbols. The data symbols in a block may have different importance. Thus, for example, interference with signaling symbols is normally more serious than with symbols for voice transmission. The method according to the invention can take account of this in an excellent manner, since the symbols or the partial blocks are dealt with individually.

The interference immunity can be described by the product of the bandwidth of the sub-carriers and the transmission duration for a symbol so that appropriate allocation of resources (number of sub-carriers and symbol duration) of the radio interface within a block defines an individual interference immunity.

A control device in the transmitting device is advantageously configured in such a manner that the symbol-related individual processing of the data symbols is switched over in accordance with the stipulations of a device for radio resource management, depending on the transmission conditions and/or the load level of a radio cell. This ensures the flexibility to satisfy the requirements, even during operation.

According to the invention, it is possible to use existing frequency bands of a GSM mobile radio network or of another mobile radio network, for example PDC, IS-54/136, PHS, DECT or IS-95, for one or more frequency bands of a sub-carrier, and/or to dispose the frequency bands between sub-carriers.

The transmitting device may be used in the base stations or the mobile stations. A major advantage of the transmission method according to the invention is that conventional detection methods can be used for the corresponding receiving devices, and it is thus possible to match the specific capabilities of the communication partner by simple parameter setting in the transmitting device.

Other features which are considered as characteristic for the invention are set forth in the appended claims.

Although the invention is illustrated and described herein as embodied in a method and a transmitting device for transmitting data symbols from subscriber signals via a radio interface of a mobile communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
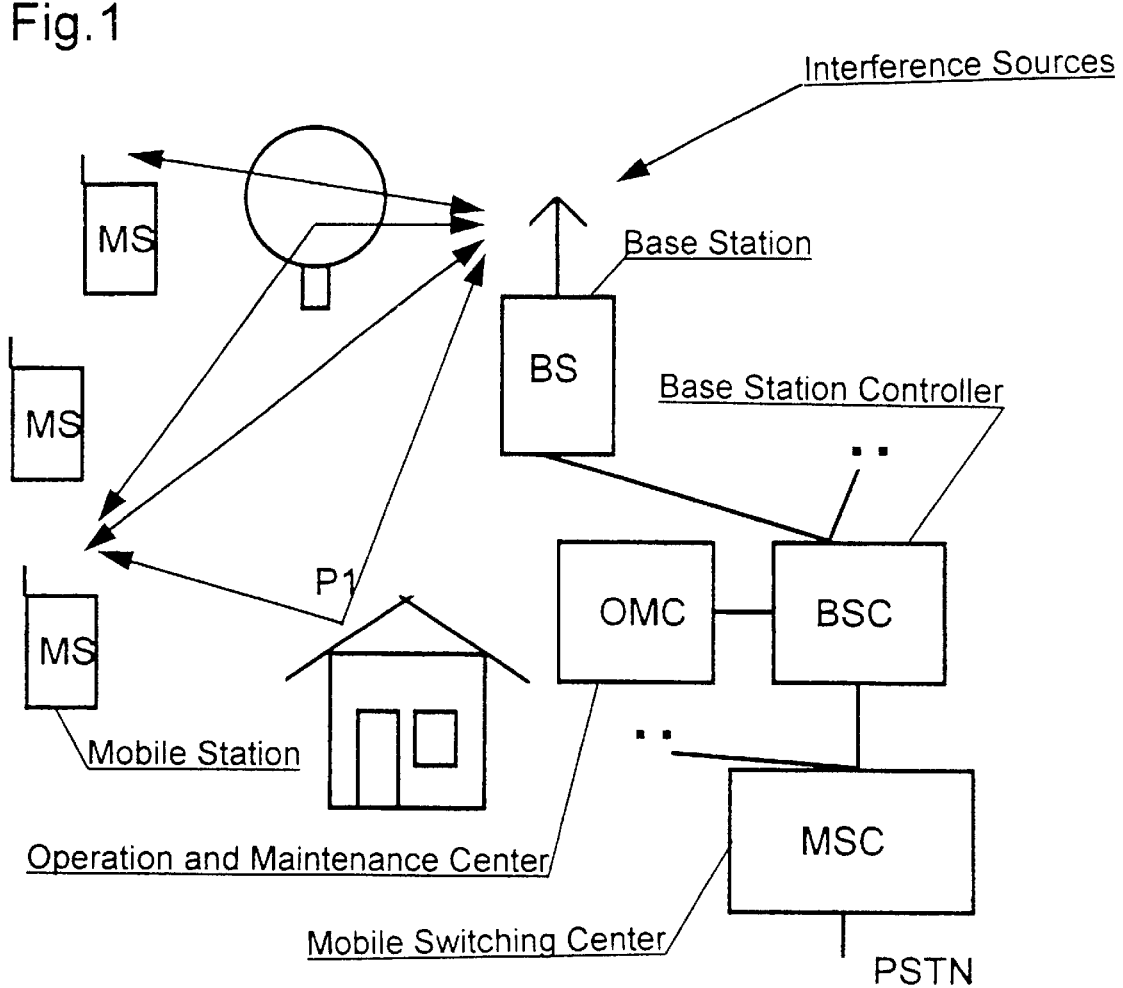
FIG. 1 is a diagrammatic, block diagram of a known mobile radio network.

In all the figures of the drawing, sub-features and integral parts that correspond to one another bear the same reference symbol in each case. Referring now to the figures of the drawing in detail and first, particularly, to FIG. 1 thereof, there is shown a structure of a mobile communications system corresponding to that of a known GSM mobile radio network which contains a plurality of mobile switching centers MSC which are networked with one another and produce access to a landline network PSTN. Furthermore, the mobile switching centers MSC are connected to in each case at least one base station controller BSC. Each of the base station controllers BSC in turn allows a link to at least one base station BS. Such a base station BS is a radio station which can set up an information link to mobile stations MS via a radio interface. By way of example, FIG. 1 shows three radio links between the three mobile stations MS and the one base station BS. An operation and maintenance center OMC carries out monitoring and maintenance functions for the mobile radio network, or for parts of it. The operation and maintenance center OMC and the base station controller BSC carry out the functions of setting and adaptation of the allocation of radio resources within the radio cells of the base stations BS. The functionality of the mobile communications system can also be transferred to other radio communications systems, and if required to fixed-position mobile stations MS as well. The method according to the invention can also be used in such radio communications systems.

The communications links between the base station BS and the mobile stations MS are subject to multi-path propagation, which is caused by reflections, for example on buildings or vegetation, in addition to a direct propagation path. If one assumes that the mobile stations MS are moving, then multi-path propagation together with other interference leads to the signal components of the various propagation paths of a subscriber signal being superimposed as a function of time at the receiving base station BS. It is furthermore assumed that the subscriber signals of different mobile stations MS are superimposed at the reception point to form a received signal since, according to the exemplary embodiment, subscriber separation is carried out using a CDMA method. The method indicated in the following text is intended to be matched to the continuously changing transmission conditions.

The task of the transmitting base station BS is to prepare for transmission data contained in the subscriber signals and to transmit such data to the individual mobile stations MS in subscriber-specific communications links.

Figure 2:
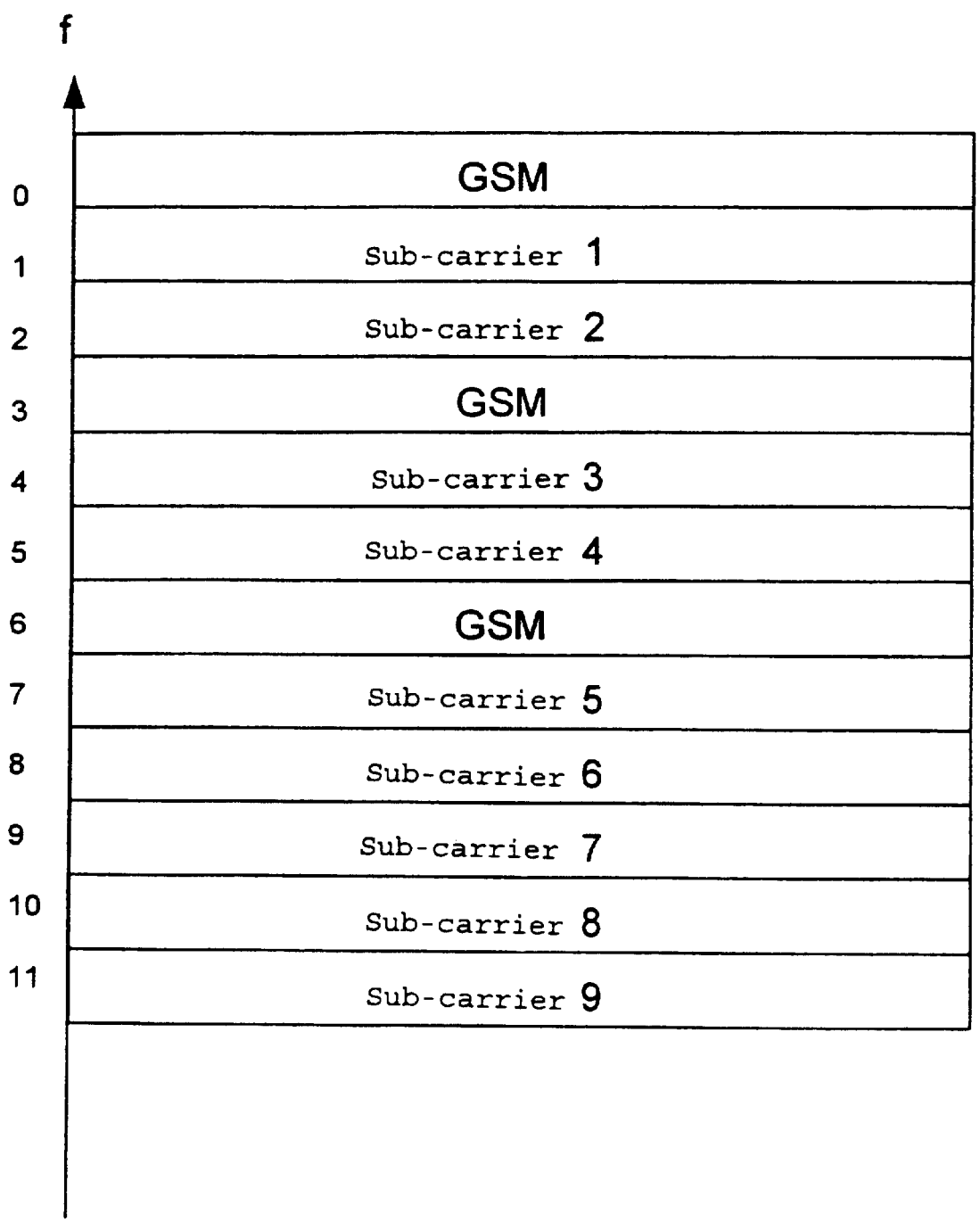
FIG. 2 is a schematic illustration of frequency resources of a radio interface according to the invention.

FIG. 2 shows a frequency allocation within the mobile communications system. A network operator has 12 frequency bands 0 . . . 11 available in a radio cell of the base station BS which, in FIG. 1, is linked to the three mobile stations MS. of these, three frequency bands are already allocated to an existing GSM mobile radio network, and will also continue to be used. Furthermore, nine sub-carriers 1, 2, . . . 9 are available. According to FIG. 2, a constant bandwidth is assumed for all the frequency bands. However, this is not a precondition for a mobile communications system in the sense of the invention.

Figure 5:
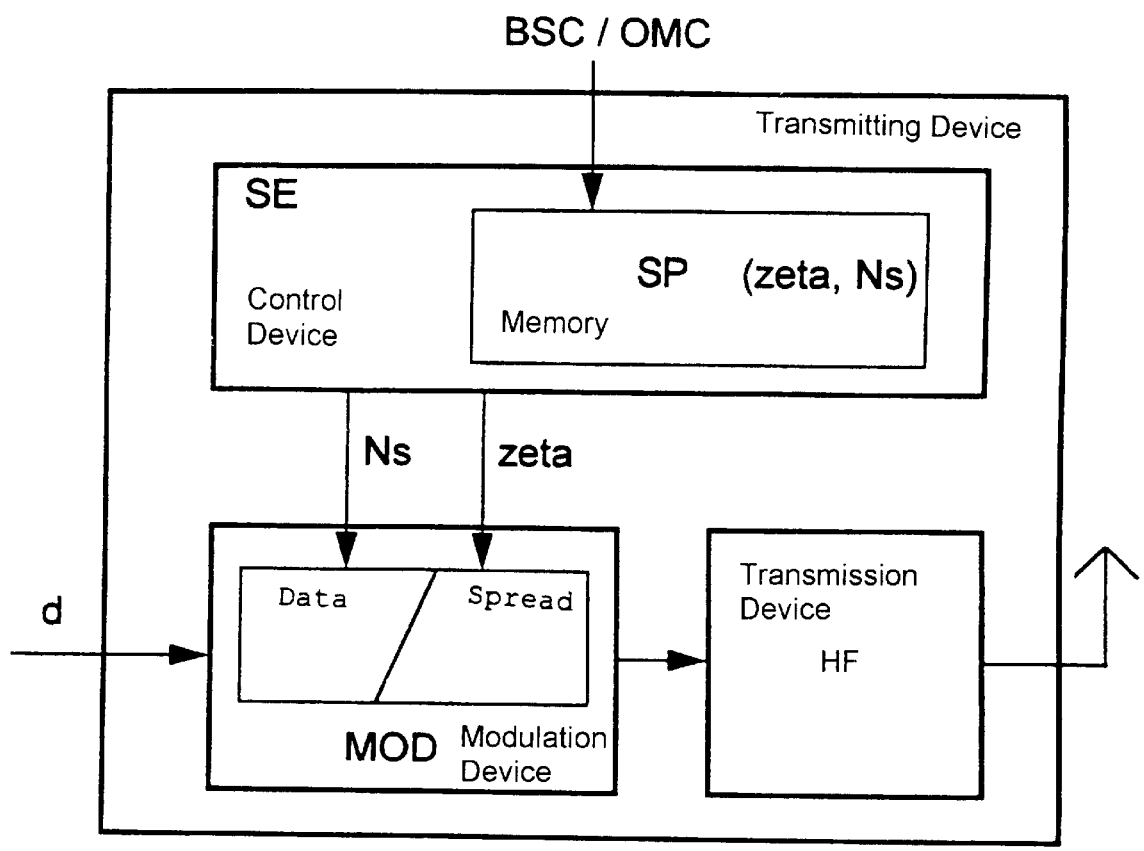
FIG. 5 is a block diagram of a transmitting device.

For a transmitting device as explained in more detail in FIG. 5, all that is required is the capability to combine a plurality of such frequency bands to form a broadband radio interface. The transmitting device can in this case be used in parallel with a transmitting device for the GSM mode, or can carry out its functions by suitable parameter setting.

Figure 3:
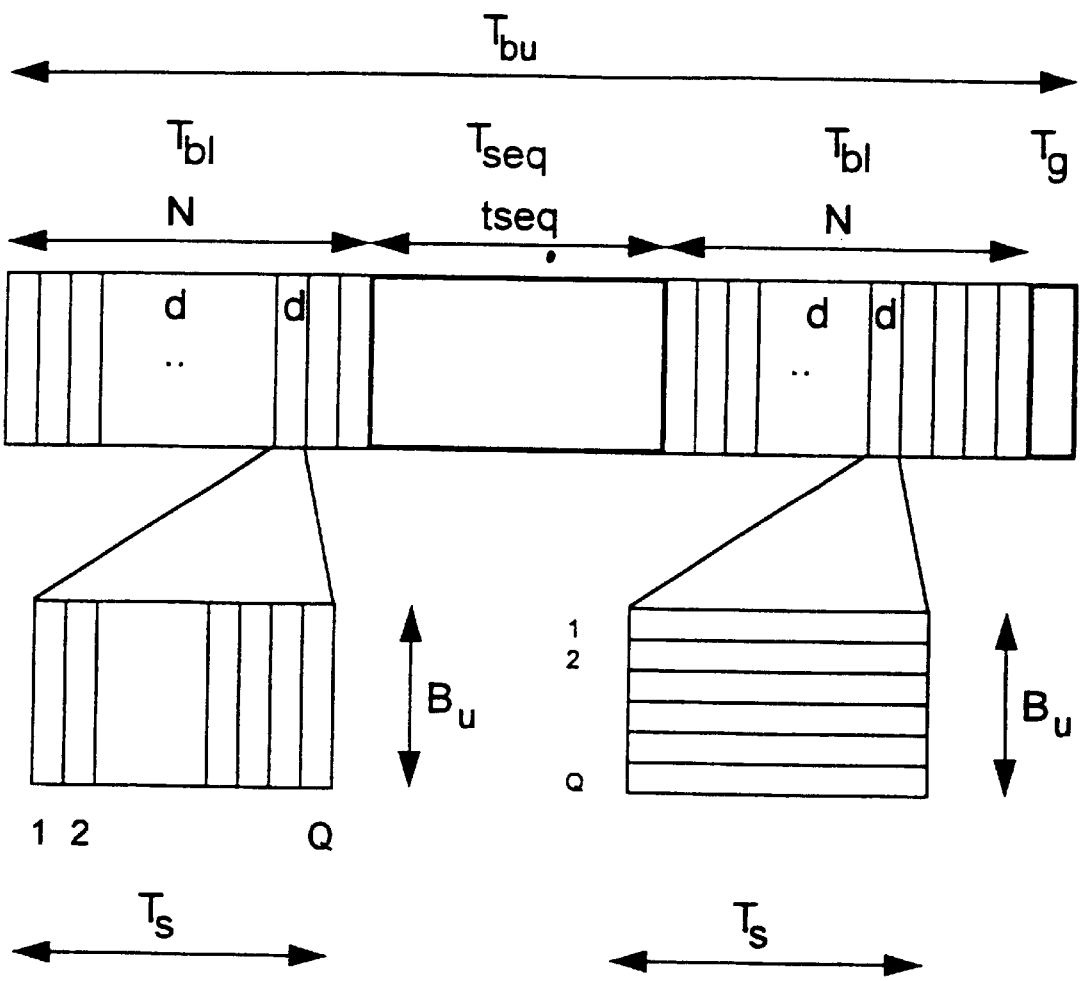
FIG. 3 is a schematic illustration of a structure of a radio block.

FIG. 3 shows the structure of a radio block of a subscriber signal. Such a radio block is transmitted in one time slot of a time division multiple access (TDMA) frame structure. Each frame contains at least one time slot for one or more subscriber signals.

The duration of the radio blocks is designated $T_{ba}$. The radio block contains two sub-blocks, each having N data symbols d, a length of each block being $T_{bl}$. The two sub-blocks are separated by a training sequence $t_{seq}$ with a duration of $T_{seq}$. The radio block is terminated by a guard time $T_g$, which is intended to compensate for delay time differences arising from the different distances between the mobile stations MS and the base station BS.

FIG. 3 also shows how an individual data symbol d can be transmitted in accordance with a pure CDMA method—on the left—or in accordance with a pure multi-carrier method—on the right. In the case of the CDMA method, each data symbol d is spread over the bandwidth $B_u$, with Q code symbols. In the case of the multi-carrier method, each data symbol d is modulated onto Q sub-carriers, the sum of the bandwidths of the sub-carriers giving the bandwidth $B_u$.

In both cases, the time to transmit a data symbol is shown by a symbol duration $T_s$.

Figure 4A:
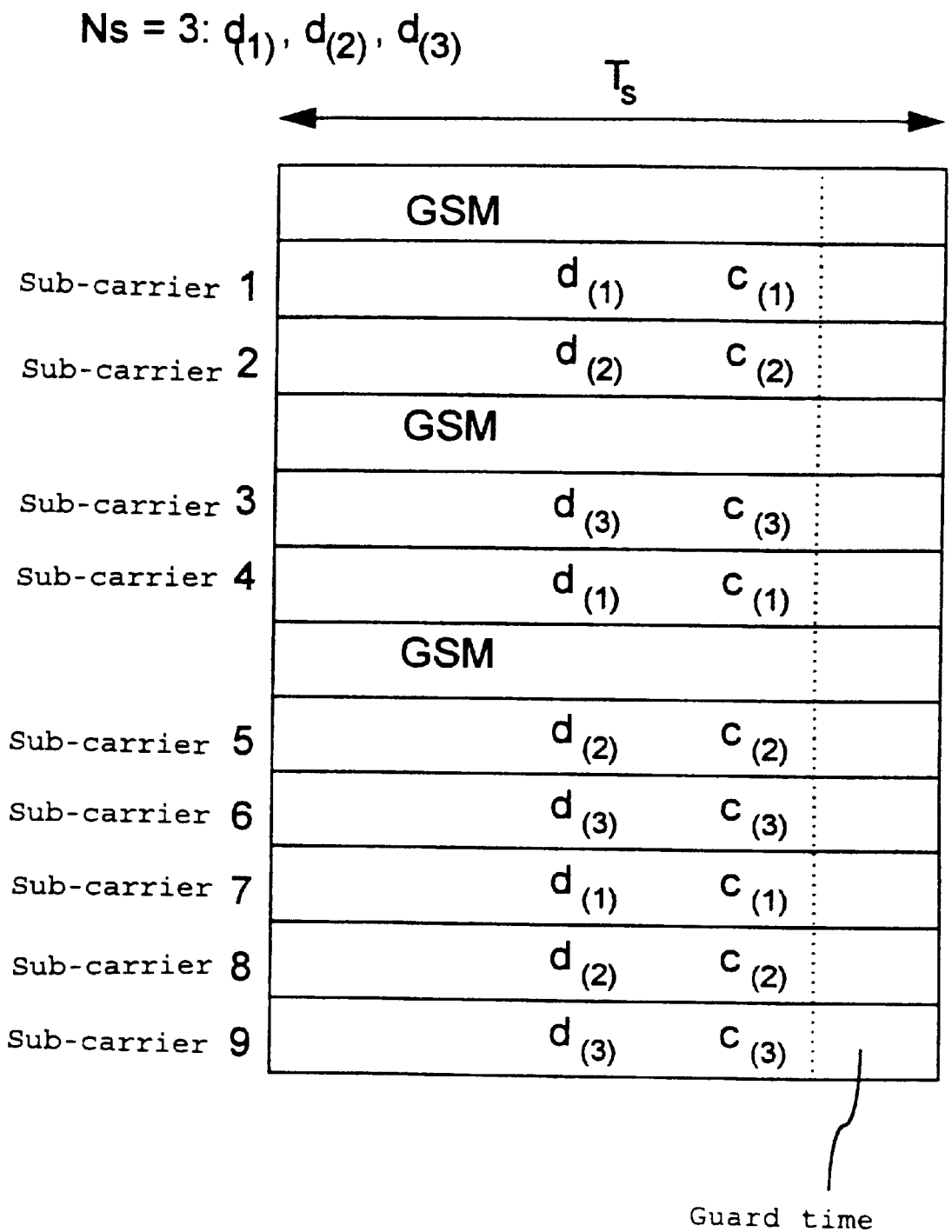
FIGS. 4a and 4b are schematic illustrations of an allocation of data to sub-carriers.
Figure 4B:
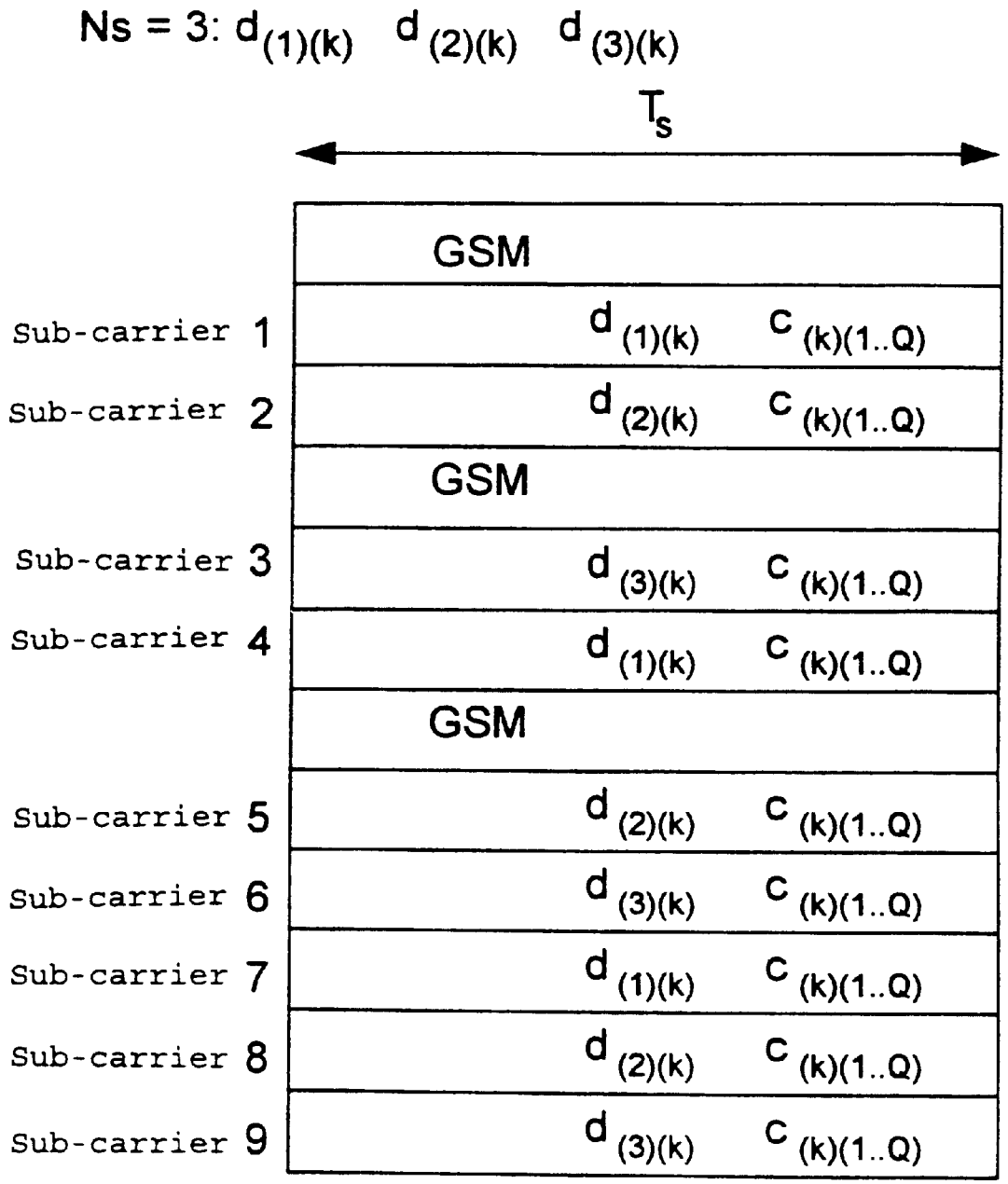

The invention now deviates from the rigid scheme of the two methods and prepares for a transmission in accordance with FIGS. 4a and 4b.

FIG. 4a shows the case of transmission of a partial block with a spread by a code symbol c per data symbol d.

The block with N data symbols d is divided in partial blocks with Ns=3 data symbols $d_{(1)}$, $d_{(2)}$ and $d_{(3)}$. The data symbol $d_{(1)}$ is allocated the sub-carriers 1, 4 and 7, the data symbol $d_{(2)}$ the sub-carriers 2, 5 and 8, and, finally, the data symbol $d_{(3)}$ the sub-carriers 3, 6 and 9. The procedure for the other partial blocks in the block is equivalent. The allocation strategy is in this case intended to maximize the interval between the center frequencies of the sub-carriers for a data symbol, for example $d_{(1)}$, in order to allow as much frequency diversity as possible to be used for the transmission.

In the allocation according to FIG. 4a, the individual data symbols $d_{(1)}$, $d_{(2)}$ and $d_{(3)}$ in the partial block are dealt with equivalently in this respect. If the individual data symbols have different weightings, an individual data symbol $d_{(1)}$ may also be given preference by allocation of a greater number of sub-carriers.

Each of the symbols is spread during the symbol duration $T_s$, with an individual code symbol $c_{(1)}$, $c_{(2)}$, $c_{(3)}$. The number of code symbols per data symbol d is in this case reduced to Q=1, as a result of which, provided the other parameters are suitably chosen, receiving stations MS without CDMA reception can also be supplied.

Particularly in this case, it is possible to provide a guard time as well within the symbol duration $T_s$, to make it easier to use cheap receivers without equalization. This allows simple and cost-effective mobile stations MS to be used.

Furthermore, the invention makes it possible to lengthen the symbol duration $T_s$, without reducing the data rate by increasing the number of simultaneously transmitted data symbols, that is to say the length Ns of the partial block. A longer symbol duration $T_s$, is advantageous, particularly within hierarchical cell structures of the mobile communications network using pico cells or microcells.

FIG. 4b shows the case of transmission of partial blocks of a plurality of subscriber signals with a spread by codes c per data symbol d.

The blocks of the K subscriber signals with N data symbols d are divided into partial blocks with Ns=3 data symbols $d_{(1)(k)}$, $d_{(2)(k)}$ and $d_{(3)(k)}$, where k=1 K. The data symbol $d_{(1)(k)}$ is allocated the sub-carriers 1, 4 and 7, the data symbol $d_{(2)(k)}$ the sub-carriers 2, 5 and 8, and, finally, the data symbol $d_{(3)(k)}$ the sub-carriers 3, 6 and 9. The procedure for the other partial blocks in the block is equivalent.

Each of the data symbols $d_{(1)(k)}$, $d_{(2)(k)}$ and $d_{(3)(k)}$ is spread during the symbol duration $T_s$, with a subscriber-specific code $c_{(k)(q)}$, k=1 . . . K, q=1 . . . Q. K is the number of subscribers in the same frequency channel and time slot, and Q is the number of code symbols per data symbol d. This subscriber-specific code $c_{(k)(q)}$ allows the data symbols $d_{(1)(k)}$, $d_{(2)(k)}$ and $d_{(3)(k)}$ of the various subscriber signals to be separated again at the receiver end, for example using a so-called JD (Joint Detection) CDMA method. In addition, it is possible to provide for individual data symbols $d_{(1)(k)}$, $d_{(2)(k)}$ and $d_{(3)(k)}$ to be spread among the different sub-carriers with different sub-carrier-related codes, thus using three different codes for the data symbols $d_{(1)(k)}$, $d_{(2)(k)}$ and $d_{(3)(k)}$.

The transmitting device for carrying out the method is shown in FIG. 5. The transmitting device contains control devices SE with a memory device SP, a modulation device MOD and a transmission device HF.

The data symbols d of the subscriber signals arrive in the transmitting device at a network end and are fed to the modulation device MOD. Data modulation, for example error protection, interleaving etc., are carried out in one part of the modulation device MOD. In addition, the data symbols d in a block are divided by the control device SE into partial blocks with Ns data symbols d.

The length Ns and the position of the partial blocks are stored in the memory device SP. In addition, values zeta are stored in matrix form which, when read by the modulation device MOD, cause the spreading of the data symbols d.

These values zeta are, for example, in the form:

$$zeta^{(k,ns)} = c_1^{(k)} * \delta^{(1,ns)} + c_2^{(k)} * \delta^{(2,ns)} + \ldots + c_Q^{(k)} * \delta^{(Q,ns)}$$

where k=1 . . . K, and ns=1 . . . Ns, δ designating the elements for inverse discrete Fourier transformation (IDFT) or some other linear transformation.

In addition, the values zeta include factors for pulse shaping:

$zeta^{(k,ns)} = a_x \cdot zeta$, where x=1 . . . 9 (since there are nine sub-carriers according to FIGS. 4a and 4b), in such a manner that, in this way, individual sub-carriers and the subsequent broadband transmitted signal are given a form which can be predetermined and which produces a narrow spectrum, for example a GMSK form or a form based on an inverted cosine function.

This type of spreading to produce transmitted signals s in the form:

$$s^{(k)} = zeta^{(k)} \cdot d^{(k)}, \text{ where } k=1 \ldots K$$

results in signals which, after digital/analogue conversion and low-pass filtering in the transmission device HF, and appropriate amplification, are transmitted via the radio interface to the receiving mobile stations MS.

The following text describes the allocation and modulation strategy which make it possible for the transmitting device, controlled by the control devcie SE, to carry out flexible transmission methods by setting of the parameters Ns, $T_s$, Q and the sub-carriers per data symbol d.

The choice of the parameters takes account of the transmission conditions (severe noise and interference) and the load level of the radio resources (time slots, frequencies, codes) in the radio cell (a large number of subscribers). These conditions are signaled to the control device SE by the base station controller BSC and/or by the operation and maintenance center OMC. The control device SE then selects a parameter set for each link.

At the same time, it is possible to comply with the requirements of the individual mobile stations MS who are requesting special transmission conditions (no CDMA or a multi-carrier method only within a specific bandwidth) and special data rates. The data set to be selected for the values zeta is also determined in this way.

The method according to the invention can carry out the below listed settings in a flexible manner.

A large number of sub-carriers per data symbol d and/or a long symbol duration $T_s$, improves the transmission quality.

A large number of data symbols d per partial block increase the data rate for a constant symbol duration $T_s$.

The transmission quality can be set specifically for the data symbols d or the partial blocks.

The pulse shaping and transformation may be variable.

Frequency diversity can be achieved by allocating a large number of sub-carriers for one data symbol d or by a plurality of code symbols per data symbol d.

The method according to the invention is thus suitable in particular for use in future mobile communications systems, such as universal mobile communications system (UMTS) or future public land mobile telecommunications system (FPLMTS).

We claim:

1. A method for transmitting data originating from subscriber signals via a radio interface of a mobile communications system, the method comprises:

forming a block from N data symbols of a subscriber signal;

dividing the block into a plurality of partial blocks each having Ns data symbols;

allocating each one of the Ns data symbols to a plurality of different sub-carriers;

modulating, in parallel, each one of the Ns data symbols onto the plurality of the different sub-carriers for simultaneous transmission, a modulation for each of the sub-carriers being carried out using at least one individual code symbol;

heterodyning the sub-carriers to form a broadband carrier; and transmitting the plurality of partial blocks via the radio interface.

2. The method according to claim 1, which comprises using linear heterodyning of the sub-carriers to form the broadband carrier.

3. The method according to claim 1, which comprises disposing unused frequency bands between one of the sub-carriers and groups of the sub-carriers for a data symbol.

4. The method according to claim 3, which comprises allocating the sub-carriers to a partial block wherein the allocation maximizes an interval between center frequencies of the sub-carriers.

5. The method according to claim 3, which comprises allocating the sub-carriers to the data symbol, wherein the allocation maximizes an interval between center frequencies of the sub-carriers.

6. The method according to claim 3, which comprises transmitting other subscriber signals in frequency bands between one of the sub-carriers and groups of the sub-carriers with the data symbols of a partial block.

7. The method according to claim 1, which comprises varying a number of the data symbols in a partial block in dependence on transmission conditions of the radio interface.

8. The method according to claim 1, which comprises varying a number Q of the sub-carriers allocated to one data symbol in dependence on transmission conditions of the radio interface.

9. The method according to claim 1, which comprises varying a period intended for transmission of a data symbol in dependence on transmission conditions of the radio interface, by varying a number of simultaneously transmitted data symbols in a partial block.

10. The method according to claim 1, which comprises providing a guard time without any transmission information within a period intended for transmission of a data symbol.

11. The method according to claim 1, which comprises choosing the data symbols from a set of complex numbers.

12. A transmitting device for transmitting data symbols originating from subscriber signals via a radio interface of a mobile communications system in which N data symbols of a subscriber signal form a block, the transmitting device comprising:

a control device for dividing the block into a plurality of partial blocks each having Ns data symbols;

a modulation device for modulating the Ns data symbols of one of the plurality of partial blocks onto a plurality of different subcarriers for simultaneous transmission, a modulation for each of the plurality of the different subcarriers being carried out with at least one individual code symbol, said modulation device also heterodyning the plurality of the different subcarriers to form a broadband carrier; and a transmission device receiving the plurality of partial blocks from said modulation device and transmitting the plurality of partial blocks via the radio interface.

13. The transmitting device according to claim 12, wherein additional subscriber separation is performed in accordance with at least one of a time division multiple access (TDMA) method and a frequency division multiple access (FDMA) method.

14. The transmitting device according to claim 12, including a memory for storing values of individual codes related to the sub-carriers in a form of a matrix, the values being read by said modulation device.

15. The transmitting device according to claim 14, wherein the values result in a linear transformation of the data symbols to form modulated data symbols.

16. The transmitting device according to claim 14, wherein the values include a factor for pulse shaping of the data symbols via a sub-carrier-related weighting.

17. The transmitting device according claim 12, wherein said control device carries out symbol-related individual processing of the data symbols by assigning a different number of the sub-carriers to at least two of the data symbols in the block.

18. The transmitting device according to claim 12, wherein said control device carries out symbol-related individual processing of the data symbols by dividing the block into at least two partial blocks each having a different number Ns of the data symbols.

19. The transmitting device according to claim 12, wherein said control device carries out symbol-related individual processing of the data symbols by allocating a different product of a bandwidth of the sub-carriers and a transmission duration for a symbol to at least two of the data symbols.

20. The transmitting device according to claim 12, wherein said control device carries out symbol-related individual processing of the data symbols by allocating a different product of a bandwidth of the sub-carriers and a transmission duration for a symbol to two of the plurality of partial blocks of the block.

21. The transmitting device according to claim 16, wherein the mobile communications system has a device for radio resource management, and said control device switches over to a symbol-related individual processing of the data symbols in dependence on at least one of transmission conditions and a load level of a radio cell in accordance with stipulations of said device for radio resource management.

22. The transmitting device according to claim 12, wherein existing frequency bands in a GSM mobile radio network are used as at least one frequency band of a sub-carrier of the sub-carriers.

23. The transmitting device according to claim 12, wherein existing frequency bands of another mobile radio network are used as at least one frequency band of a sub-carrier of the sub-carriers.

24. A base station for transmitting data symbols originating from subscriber signals via a radio interface of a mobile communications system in which N data symbols of a subscriber signal form a block, the base station comprising:

a transmitting unit, including:

a control device for dividing the block into a plurality of partial blocks with Ns data symbols;

a modulation device for modulating the Ns data symbols of one of the plurality of the partial blocks onto a plurality of different subcarriers for simultaneous transmission, a modulation for each of the plurality of the different subcarriers being carried out with at least one individual code symbol, said modulation device also heterodyning the plurality of the different subcarriers to form a broadband carrier; and a transmission device receiving the plurality of partial blocks from said modulation device and transmitting the plurality of partial blocks via the radio interface.

25. A mobile station for transmitting data symbols originating from subscriber signals via a radio interface of a mobile communications system in which N data symbols of a subscriber signal form a block, the mobile station comprising:

a transmitting unit, including:

a control device for dividing the block into a plurality of partial blocks with Ns data symbols;

a modulation device for modulating each one of the Ns data symbols of one of the plurality of the partial blocks onto a plurality of different subcarriers for simultaneous transmission, a modulation for each of the plurality of the different subcarriers being carried out with at least one individual code symbol, said modulation device also heterodyning sub-carriers to form a broadband carrier; and a transmission device receiving the plurality of partial blocks from said modulation device and transmitting the plurality of partial blocks via the radio interface.

* * * * *